Patented Oct. 22, 1935

2,018,632

UNITED STATES PATENT OFFICE 2,018,632

PROCESS OF MAKING AN EASILY WATER SOLUBLE ALKALI METAL METASILICATE

Ernest R. Boller, Cleveland Heights, Ohio, assignor to The Grasselli Chemical Company, Cleveland, Ohio, a corporation of Delaware No Drawing. Application December 20, 1932, Serial No. 648,098

4 Claims. (Cl. 23—110)

The present invention relates to a process of making easily water soluble alkali metal metasilicate hydrates and comprises incorporating an easily decomposable perodixde and per-salts into a melt of metasilicate and solidifying such a melt.

By this process a spongy, light product is obtained which is very easily and rapidly soluble in water.

The usual technical sodium metasilicate is the pentahydrate which melts in its water of crystallization.

I add to such a melt a small amount of a decomposable peroxide, such as hydrogen peroxide, sodium peroxide, sodium per-borate, etc. This decomposes slowly with evolution of oxygen which remains occluded in the plastic mass forming on cooling a light, porous mass which easily breaks up and is very quickly soluble in water. The peroxide is completely decomposed in this manner. Sodium per-borate reacts in this reaction as if it consisted of sodium metaborate with $H_2O_2$ of crystallization. Amounts of 2% sodium peroxide are entirely sufficient to produce in this manner a light, porous, easily soluble product.

I have also mixed sodium metasilicate pentahydrate with an aqueous solution of hydrogen peroxide, 30%; the peroxide decomposed quite readily, converting the whole mass into a sort of foam which after solidification was easily broken up and was quite readily soluble in water.

I claim:

1. The process of producing a porous, easily water soluble alkali metal metasilicate hydrate which comprises mixing a molten alkali metal metasilicate hydrate with an easily decomposable peroxide and solidifying the mixture.

2. The process of producing an easily water soluble sodium metasilicate hydrate which comprises mixing a molten sodium metasilicate hydrate with an easily decomposable peroxide and solidifying the mixture.

3. The process of producing an easily water soluble sodium metasilicate hydrate which comprises mixing a molten sodium metasilicate hydrate with sodium peroxide and solidifying the mixture.

4. The process of producing an easily water soluble sodium metasilicate hydrate which comprises mixing molten metasilicate hydrate with an aqueous solution of hydrogen peroxide and solidifying the mixture.

ERNEST R. BOLLER.